(12) United States Patent
Megerian et al.

(10) Patent No.: US 9,046,035 B2
(45) Date of Patent: Jun. 2, 2015

(54) COMPRESSION RAMP BOUNDARY LAYER REMOVAL

(75) Inventors: Sevan Megerian, Van Nuys, CA (US); Chandler Clifton, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1083 days.

(21) Appl. No.: 13/088,270

(22) Filed: Apr. 15, 2011

(65) Prior Publication Data
US 2012/0260661 A1 Oct. 18, 2012

(51) Int. Cl.
*F02B 27/00* (2006.01)
*F02K 99/00* (2009.01)
*F02C 7/057* (2006.01)
*F02K 7/10* (2006.01)

(52) U.S. Cl.
CPC . *F02C 7/057* (2013.01); *F02K 7/10* (2013.01); F05D 2270/17 (2013.01)

(58) Field of Classification Search
USPC .......... 60/262, 230; 137/15.1, 15.2; 244/53 B
See application file for complete search history.

(56) References Cited

U.S. PATENT DOCUMENTS

| 3,664,612 | A | * | 5/1972 | Skidmore et al. | 244/53 B |
| 3,937,238 | A | * | 2/1976 | Stewart et al. | 137/15.1 |
| 4,620,679 | A | | 11/1986 | Karanian | |
| 5,014,933 | A | * | 5/1991 | Harm et al. | 244/53 B |
| 2008/0286094 | A1 | * | 11/2008 | Jain | 415/148 |

OTHER PUBLICATIONS

"Turbojet and Turbofan Systems", Quest for Performance: The Evolution of Modem Aircraft, Part II: The Jet Age, Chapter 10: Technology of the Jet Airplalne, pp. 1-8, retrieved from <http://www.hq.nasa.gov/office/pao/History/SP-468/ch10-3.htm>.

* cited by examiner

*Primary Examiner* — Craig Kim
(74) *Attorney, Agent, or Firm* — McDermott Will & Emery LLP

(57) ABSTRACT

An inlet for removal of a boundary layer from an incoming air flow of an engine is disclosed. The inlet includes at least one compression element proximate to an inlet aperture of the engine. The compression element is selectably moveable between a first position and a second position along an axis. A boundary layer removal aperture is open when the compression element is in the first position and the boundary layer removal aperture is closed when the compression element is in the second position.

15 Claims, 5 Drawing Sheets

COMPRESSION RAMP BOUNDARY LAYER REMOVAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

The present disclosure generally relates to systems and methods of removing a boundary layer of air from the incoming air flow of a jet engine.

2. Description of the Related Art

Turbojet propulsion systems are employed extensively in jet-powered aircraft. A tremendous amount of power can be extracted from a single, modern turbo-propulsion system. To generate this power with maximum efficiency, large quantities of propulsion-system air must be delivered to the engine face with minimum aerodynamic loss, turbulence, and flow distortion for a wide range of engine-operating conditions. As one example, a jet transport must inhale air efficiently in the near-static condition at the beginning of takeoff roll, in the relatively low-speed, high-power climb condition, and while cruising at high speed at high altitude. At all flight conditions, the propulsion-system air must be decelerated to a low-speed, high-pressure state at the engine compressor face. The detailed design of the air intake determines the efficiency with which the air is delivered to the propulsion system.

Fixed-geometry inlets are suitable for aircraft designed to operate at subsonic and low supersonic speeds. For flight at Mach numbers much beyond 1.6, however, variable-geometry features must be incorporated in the inlet if acceptably high inlet pressure recoveries together with low external drag are to be achieved. This complication is dictated by the physical laws governing the flow of air at supersonic speeds, and many supersonic aircraft have inlets with inlet features that vary automatically in a prescribed manner as the Mach number changes. In some aircraft, a compression ramp or cone that is disposed forward of the inlet aperture is moved forward or aft to maximize the inlet efficiency.

One of the sources of loss of efficiency is ingestion of the boundary-layer of the incoming air flow. Air flowing along a surface that is forward and proximate to the inlet aperture will develop a layer of air having a reduced velocity, and the mass of air delivered to the engine is reduced by the difference in the velocity of the boundary-layer air and the velocity of the free stream air. Previous approaches to removing this boundary layer from the air include the use of porous or perforated surfaces that either draw in the boundary layer air or inject additional air into the air stream to accelerate the boundary layer air. Some designs include diverter plates that deflect the boundary layer to the outside of the intake aperture. Some systems include chevrons or tabs that disrupt the boundary layer flow and mix the boundary layer air back into the free stream air. Other systems use fixed slots that draw in the boundary layer.

SUMMARY

One of the drawbacks of existing fixed-geometry boundary-layer-removal devices is that the devices induce drag on the aircraft. While there may be an improvement in engine efficiency that overcomes the drag of the devices within a certain range, the benefits of boundary layer removal decrease as the airspeed increases, and above a certain speed it is desirable to remove the boundary-layer removal device from the airflow as it is adding drag without providing a significant improvement in engine performance. There is a need for a boundary-layer-removal device that can be deployed in flight conditions where removal of the boundary layer of air is beneficial and stowed during flight conditions when it is desirable to minimize drag and boundary layer removal is of reduced benefit. Furthermore, it is desirable to provide such a deployable/stowable system without incurring an increase in weight, cost, or complexity of the systems of the aircraft.

The disclosed system provides a boundary layer removal system that is adjustable in flight between a stowed position to an open position, such that the amount of boundary layer removal can be selected according to, in certain embodiments, the velocity and density of the incoming air. In certain embodiments, this boundary layer removal system utilizes the same components as currently used on the variable-geometry inlets of supersonic aircraft, minimizing the additional weight and complexity of the added system.

In certain embodiments, an inlet for removal of a boundary layer from the incoming air flow of an engine is disclosed. The inlet includes at least one compression element proximate to an inlet aperture of the engine. The compression element is selectably moveable between a first position and a second position along an axis. A boundary layer removal aperture is open when the compression element is in the first position and the boundary layer removal aperture is closed when the compression element is in the second position.

In certain embodiments, an air-breathing engine assembly is disclosed that includes an engine configured to accept an incoming flow of air at a forward end and expel an exhaust at an aft end. The engine assembly also includes an inlet assembly having a housing coupled to the engine and at least one compression element coupled to the housing. The compression element has a first portion linearly movable with respect to the housing between a first position and a second position along an axis parallel to a direction of the incoming air flow. The compression element is configured such that a boundary layer removal aperture is open when the first portion is in the first position and the boundary layer removal aperture is closed when the first portion is in the second position. The engine assembly also includes a first actuator coupled to the first portion of the compression element, the first actuator configured to selectable move the first portion between the first and second positions.

In certain embodiments, a method of removing a boundary layer from an incoming air flow at an inlet of an engine is disclosed. The method includes the step of moving a forward portion of a compression element disposed in front of the inlet of the engine along an axis parallel to a direction of the incoming air flow so as to open a boundary layer removal aperture.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The following description discloses embodiments of an inlet of a variable-geometry jet engine configured to remove a selectable amount of a boundary layer of the incoming airflow prior to the air entering the inlet aperture, wherein the selectable amount is adjusted during flight. The disclosed system can be selectably moved to a closed position wherein the drag induced by the boundary-layer-removal system is minimized.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The method and system disclosed herein are presented in terms of an enclosure of a supersonic aircraft equipped with a turbojet engine. It will be obvious to those of ordinary skill in the art that this same configuration and method can be utilized in a variety of applications requiring removal of a boundary layer of air from an incoming air flow such as, for example, the intake systems of wind tunnels and jet engines adapted for vehicles other than aircraft. Nothing in this disclosure should be interpreted, unless specifically stated as such, to limit the application of any method or system disclosed herein to a jet engine intake system.

Figures 1, 2:
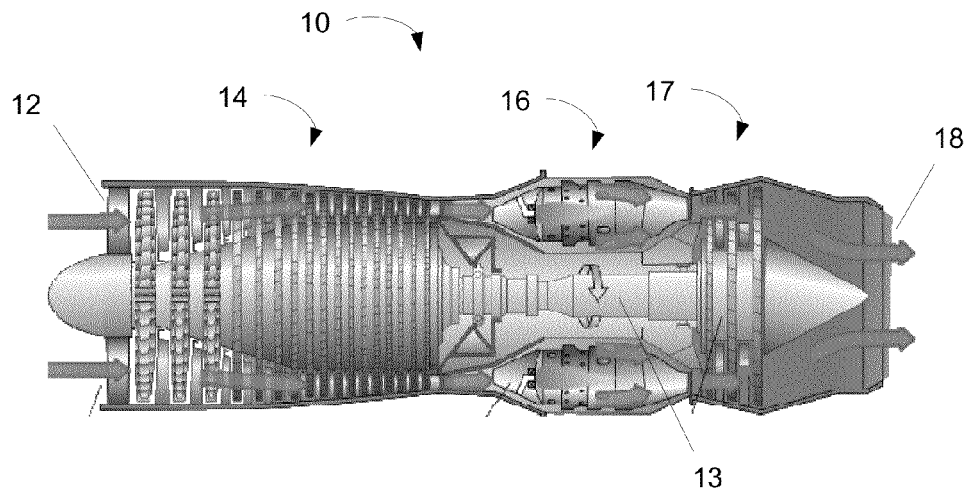
FIG. 1 is a cut-way illustration of an exemplary turbojet engine.
FIG. 2 is a perspective view of an exemplary aircraft having two jet engines with rectangular air inlets attached to the surfaces of the wings.

FIG. 1 is a cut-way illustration of an exemplary turbojet engine 10. The engine 10 includes a compressor 14, a combustor 16, and a turbine 17 that is coupled to the compressor 14 through shaft 13. In the turbojet 10, all the incoming air passes into the engine though inlet 12 and then through each of the elements 14, 16, and 17 of the engine 10 and out the exhaust port 18. The compressor 14 raises the pressure of the incoming air above the pressure of the air at the inlet 12. The pressure ratio varies for different engines but may approach 30 to 1. The high-pressure air coming out of the compressor enters the combustor 16 where fuel (not shown) is injected. The fuel-air mixture is ignited and the resulting hot gases pass through the turbine 17 that, in turn, drive the compressor 14. The exhaust from the turbine 17 provides the thrust that propels the aircraft (not shown).

FIG. 2 is a perspective view of an exemplary aircraft 20 having two jet engines 22 with rectangular air apertures 26 attached to the surfaces 24 of the wings. The airflow over the portion of the wing surfaces 24 that is forward of the air apertures 26 will develop a boundary layer (not shown in FIG. 2) that is discussed in greater detail with respect to FIG. 5A.

Figure 3:
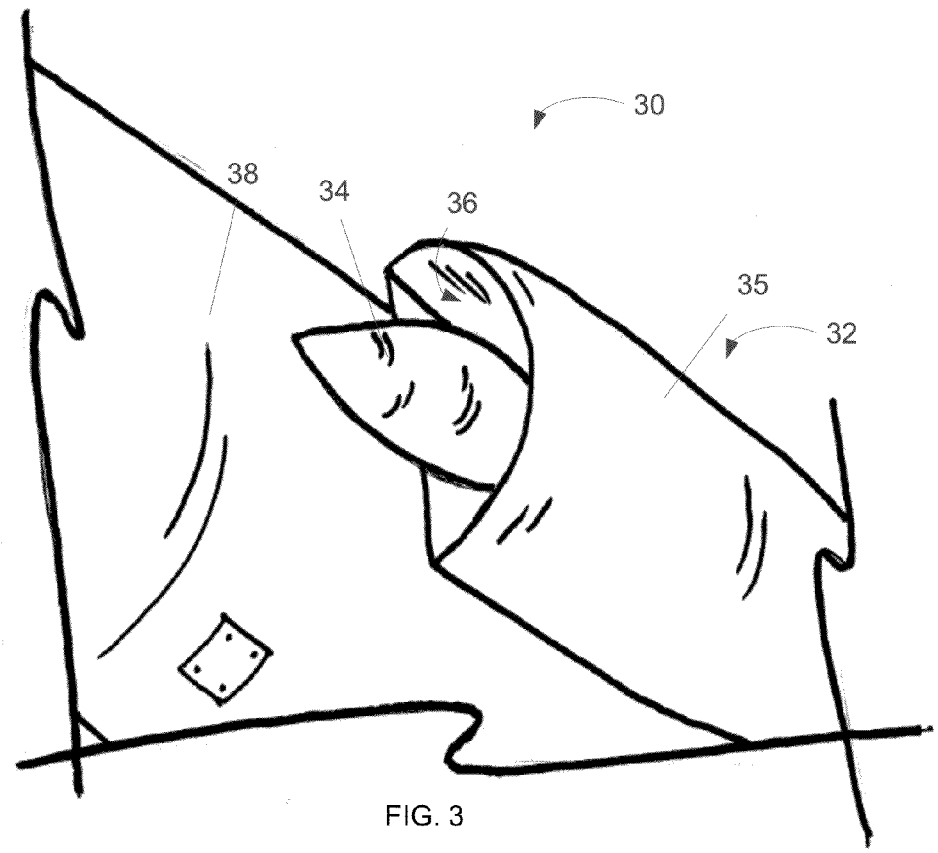
FIG. 3 is a partial perspective view of an aircraft with an exemplary fuselage-mounted jet engine with an semicircular air inlet.

FIG. 3 is a partial perspective view of an aircraft 30 with an exemplary fuselage-mounted jet engine 32 with a semicircular air aperture 36. In this embodiment, there is a half-conical compression surface 34 positioned in front of the air aperture 36 and a half-cylindrical cowling 35 around the outside edge of air aperture 36. This type of compression surface 34 may be fixed or movable depending on the aircraft. The effect of the compression surface 34 is discussed in greater detail with respect to FIG. 5A. In this type of engine 32, the airflow over the portion of the fuselage 38 that is forward of the air aperture 36 will develop a boundary layer (not shown in FIG. 3) that is discussed in greater detail with respect to FIG. 5A.

Figure 4:
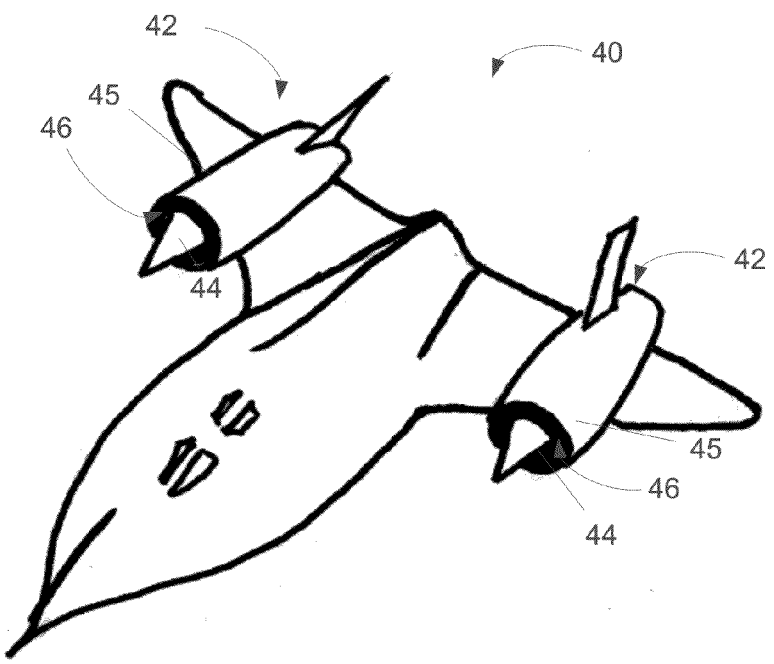
FIG. 4 is a perspective view of an exemplary aircraft having two engines with circular air inlets.

FIG. 4 is a perspective view of an exemplary aircraft 40 having two engines 42 with circular air apertures 46. In this embodiment, there is a conical compression surface 44 positioned in front and in the middle of the air aperture 46 and a cylindrical cowling 45 around the outside of the air aperture 46. Although there is no wing or fuselage surface in front of the air inlet 46 that can develop a boundary layer, the conical compression surface 44 is large enough that a boundary layer may form along the cone that may be desirable to remove in certain modes of flight.

Figure 5A:
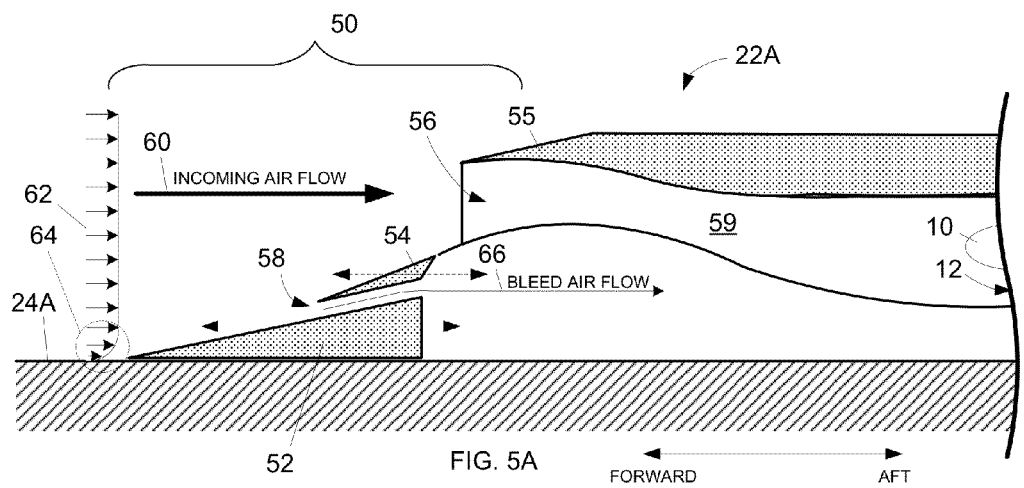
FIG. 5A is a cutaway side view of an exemplary rectangular air inlet according to certain aspects of this disclosure.

FIG. 5A is a cutaway side view of an exemplary rectangular air inlet 50 according to certain aspects of this disclosure. An air ducting system 22A is coupled to a surface 24A such as the wing surface 24 of FIG. 2. The air ducting system 22 has an inlet aperture 56 connected to a shaped air passage 59 that leads to the inlet 12 of an engine 10 such as shown in FIG. 1. The incoming air flow 60 has a velocity profile with a region of constant velocity that is distant from the surface 24A and a region adjacent to the surface 24A that is a boundary layer 64 having a varied velocity profile wherein the air velocity approaches zero, relative to the surface 24A, at the surface 24.

The air inlet 50 includes at least one compression ramp 52 positioned forward of the aperture 56 and on the side of the inlet aperture 56 nearest the surface 24A. In certain embodiments, the compression ramp has a second portion 54 that is positioned aft of the compression ramp 52. The compression ramps 52, 54 guide air away from the surface 24A and into the inlet aperture 56. The compression ramps 52, 54, the inlet aperture 56, and the passage 59 are configured to compress and deliver the air flow 60 to the inlet 12. In certain embodiments, compression ramps 52, 54 are movable forward and aft to adjust the compression of the air flow 60 and the positioning of shock waves (not shown) that develop during supersonic flight.

Ingestion of the boundary layer 64 reduces the amount of air delivered to the engine 10 as the velocity of the air in the boundary layer 64 is, on average, less than the velocity of the free stream air in region 62. Removal of the slower boundary layer 64 just before the inlet aperture 56 increases the average velocity of the incoming air 60 at the inlet aperture 56 and, therefore, enables the engine 10 to produce more thrust.

In certain embodiments, compression ramps 52 and 54 are configured such that a boundary layer removal slot 58 is formed between the compression ramps 52 and 54. When slot 58 is open, the air near the surface, i.e. the boundary layer 64, is diverted into slot 58 forming a bleed air flow 66 that is guided away from the inlet 12 of the engine 10. In certain embodiments, the compression ramp 52 moves forward and aft while the compression ramp 54 is fixed such that adjustment of the compression of airflow 60 is linked to the size of slot 58. As compression ramp 52 moves forward, the slot 58 will become smaller until the slot closes. In certain embodiments, compression ramp 52 can move further forward after slot 58 closes. In certain embodiments, the compression ramps 52 and the 54 move forward and aft independently so that the compression of the airflow 60 and the size of slot 58 are independently controlled. In certain embodiments, compression ramp 52 is fixed in position while compression ramp 54 moves forward and aft.

One of the advantages of the disclosed system is that the slot 58 can be opened, adjusted in size, and closed without requiring additional actuators or articulation mechanisms beyond what is required to provide a variable geometry inlet. Embodiments of air inlet 50 that provide a variable size boundary layer removal slot 58 will require a small amount of additional structure such that motion of compression ramp 52, for example, creates a slot 58. Additional structure is also required aft of slot 58 to guide the bleed air flow 66. These are minor modifications compared to the addition of separate articulated flaps or diverters with their own actuators. This elegant simplicity improves the reliability and weight of the aircraft compared to a system with additional parts, structure, and actuators.

Figure 5B:
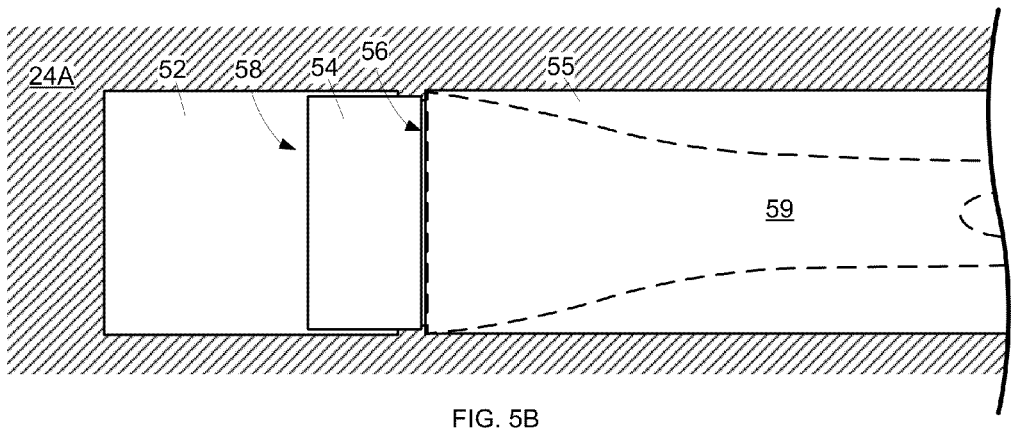
FIG. 5B is a top view of the rectangular air inlet of FIG. 5A according to certain aspects of this disclosure.

FIG. 5B is a top view of the rectangular air inlet of FIG. 5A according to certain aspects of this disclosure. It can be seen that the compression ramps 52, 54 generally occupy the same area as fixed or variable geometry systems that lack a boundary layer removal slot 58.

Figure 5C:
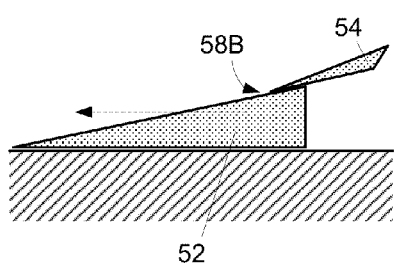
FIGS. 5C-5D are cutaway side views of the compression ramps of the rectangular air inlet of FIG. 5A according to certain aspects of this disclosure.
Figure 5D:
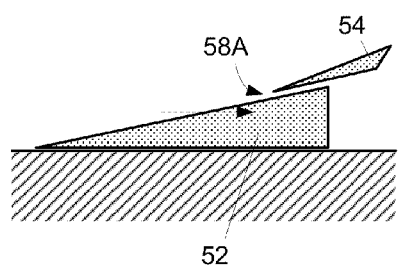

FIGS. 5C-5D are cutaway side views of the compression ramps of the rectangular air inlet of FIG. 5A according to certain aspects of this disclosure. FIG. 5C depicts the configuration of the system of FIG. 5A where compression ramp 52 has moved forward relative to compression ramp 54 such that the boundary layer removal slot 58B is closed, or stowed, and the two compression ramps 52, 54 form a continuous compression ramp such as may be desirable at supersonic speeds.

FIG. 5D depicts the configuration of the system of FIG. 5A when compression ramp 53 has moved slightly aft of the configuration of FIG. 5C such that slot 58A is open with an inlet area that is smaller than present in the configuration of FIG. 5A. It can be seen that adjustment of the position of compression ramps 52 and 54 allow the slot 58 to have any desired opening between fully closed, as shown in FIG. 5C, and fully open. This relative position of compression ramps 52 and 54 is, in certain embodiments, independent of the common motion of the ramps 52, 54 that adjust the compression of air flow 60.

Figure 6A:
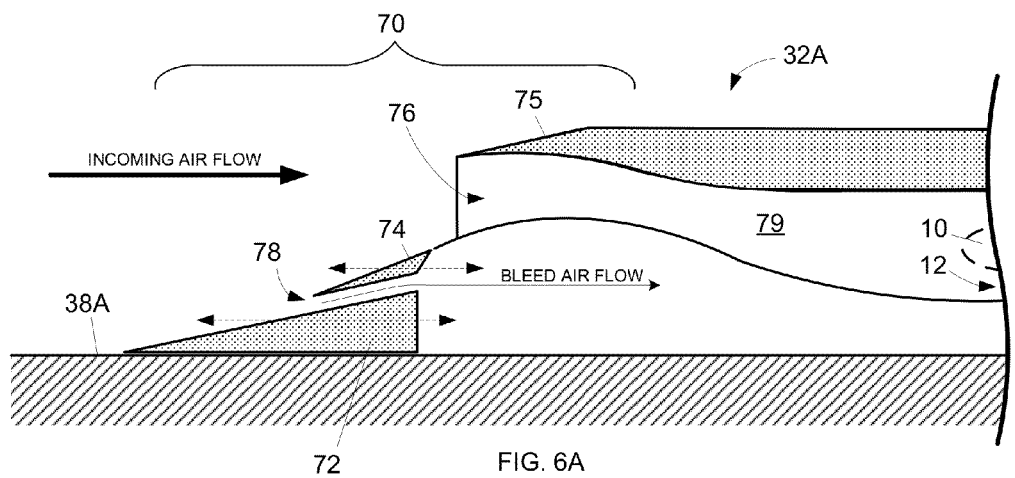
FIG. 6A is a cutaway side view of an exemplary semicircular air inlet according to certain aspects of this disclosure.

FIG. 6A is a cutaway side view of an exemplary semicircular air inlet 70 according to certain aspects of this disclosure. This air ducting system 32A is mounted on a fuselage surface 38A similar to the engine 32 illustrated in FIG. 3, the semicircular air inlet 70 has an inlet aperture 76 surrounded by a semicircular cowling 75 connected to an air passage 79. Compression cones 72 and 74 are actually half-cones and truncated half-cones, respectively, in form. A semicircular boundary layer removal slot 78 is formed by differential movement forward and aft by compression cones 72, 74.

Figure 6B:
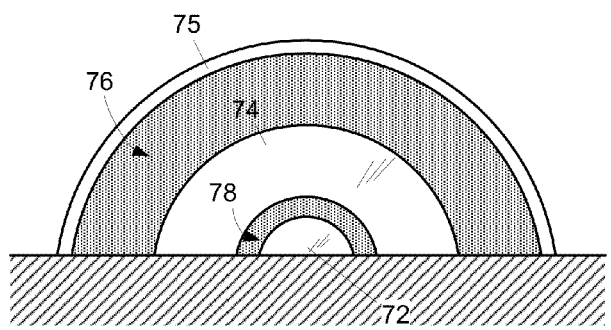
FIGS. 6B-6C are front and top views, respectively, of the semicircular air inlet of FIG. 6A according to certain aspects of this disclosure.
Figure 6C:
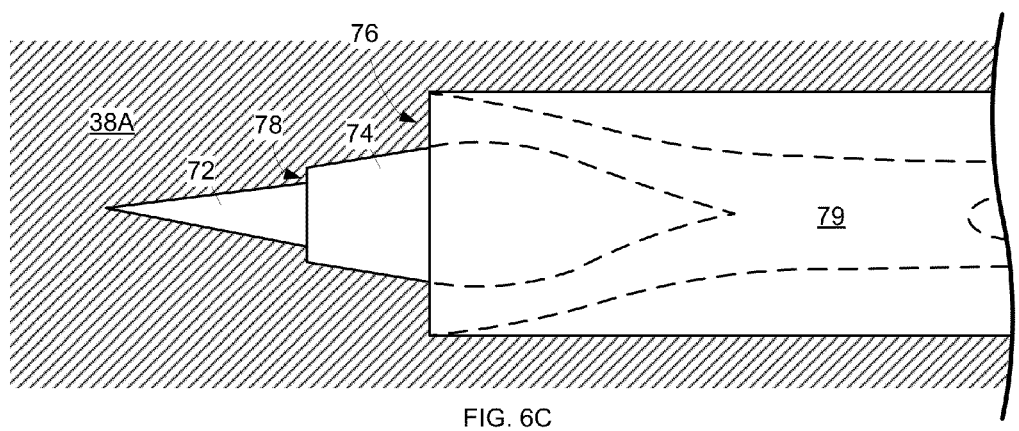

FIGS. 6B-6C are front and top views, respectively, of the semicircular air inlet of FIG. 6A according to certain aspects of this disclosure. The semicircular nature of the inlets 76, 78 and the cowling 75 can be seen most easily in FIG. 6B. The conical and truncated conical shapes of compression cones 72 and 74, respectively, can be seen most easily in FIG. 6C. In certain embodiments, the air ducting system 32A feeds air to a single engine 10. In certain embodiments, the engine 10 is positioned within the fuselage. In certain embodiments, a pair of air ducting systems 32A, located on the opposite sides of the fuselage, feed a single engine 10. Side-mounted air ducting systems 32A provide flexibility in inlet size, shape, vertical position, and fore and aft location and represent a compromise of the conflicting aerodynamic, structural, weight, and space requirements. For these reasons, side-mounted air ducting system 32A are used on many modern combat aircraft.

Figure 7A:
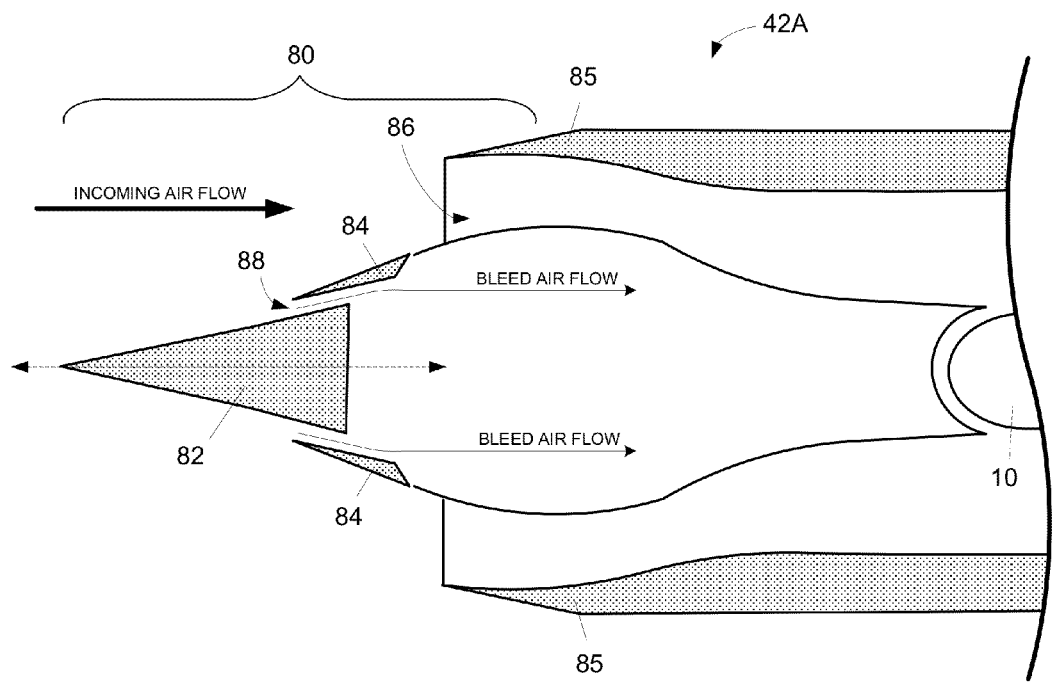
FIG. 7A is a cutaway side view of an exemplary circular air inlet according to certain aspects of this disclosure.

FIG. 7A is a cutaway side view of an exemplary circular air inlet 80 according to certain aspects of this disclosure. This air ducting system 42A is similar to the engines 42 illustrated in FIG. 4, the system has a toroidal inlet aperture 86 surrounded by a circular cowling 85. In the center of the inlet aperture 86, there is a conical compression ramp 82 and a truncated conical compression ramp 84 that form a boundary layer removal slot 88 when differentially positioned forward and aft.

Figure 7B:
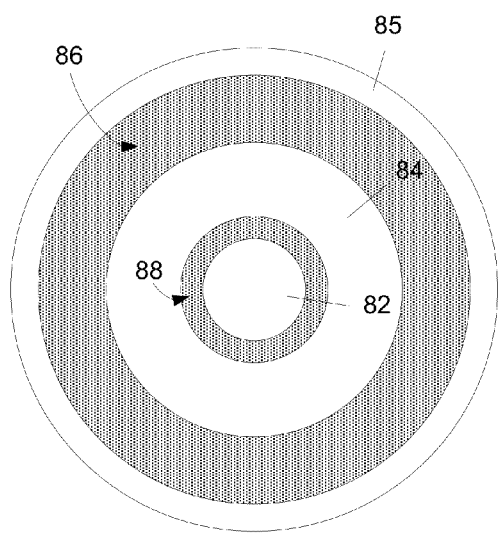
FIG. 7B is a front views of the circular air inlet of FIG. 7A according to certain aspects of this disclosure.

FIG. 7B is a front views of the circular air inlet 80 of FIG. 7A according to certain aspects of this disclosure. The toroidal shape of inlets 86 and 88 is easily visible in FIG. 7B. As there is no fuselage or wing surface proximate to the inlet aperture 86, the only boundary layer to be removed is the one formed on the compression cone 82.

The concepts disclosed herein provide a system and method of removing a selectable amount of a boundary layer from the incoming air flow before the air flow enters the inlet aperture. The system includes at least one movable compression ramp or cone that can be positioned to adjust the compression of the incoming air flow and open a boundary layer removal aperture. In certain embodiments, there are two cooperating compression ramps that move together to adjust the compression of the incoming air flow and position of certain shock waves, and also move differentially to open, or deploy, and close, or stow, a boundary layer removal aperture. The size of the boundary layer removal aperture is controlled by the amount of differential motion between the two compression ramps.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An inlet for removal of a boundary layer from an incoming air flow of an engine, the inlet comprising:
    at least one compression element disposed between an inlet aperture of the engine and a compression ramp surrounded by the inlet aperture, the inlet aperture being positioned proximate to an external surface of a vehicle, the compression ramp being disposed on a side of the inlet aperture adjacent to the external surface, the compression element selectably moveable relative to the compression ramp between a first position and a second position along an axis parallel to a direction of incoming air flow, wherein a boundary layer removal aperture is open when the compression element is in the first position and the boundary layer removal aperture is closed when the compression element is in the second position, and wherein the compression element is configured to move to at least one third position on the axis between the first and second position to provide a selectable amount of boundary layer removal.

2. The inlet of claim 1, wherein the inlet aperture is generally rectangular.

3. The inlet of claim 2, wherein the compression element comprises an aft compression ramp having a leading edge that is proximate to a trailing edge of the compression ramp, the aft compression ramp linearly movable between a first position and a second position along an axis parallel to the axis of motion of the compression ramp.

4. The inlet of claim 3, wherein the compression ramp and aft compression ramp are configured to move in unison to modify the compression of the incoming air at the inlet aperture and to move differentially to provide a selectable amount of boundary layer removal.

5. The inlet of claim 1, wherein:
    the inlet aperture is generally a half-ellipsoid; and
    the compression ramp comprises a forward compression half-conical ellipsoid.

6. The inlet of claim 5, further comprising an aft compression truncated half-conical ellipsoid having a leading edge that is proximate to a trailing edge of the forward compression half-conical ellipsoid, the aft compression truncated half-conical ellipsoid linearly movable between a first position and a second position along an axis parallel to the axis of motion of the forward compression half-conical ellipsoid.

7. The inlet of claim 6, wherein the forward compression half-conical ellipsoid and the aft compression truncated half-conical ellipsoid are configured to move in unison to modify the compression of the incoming air at the inlet aperture and to move differentially to provide a selectable amount of boundary layer removal.

8. The inlet of claim 1, wherein:
    the inlet aperture is generally axisymmetric; and
    the compression ramp comprises a forward compression conical ellipsoid disposed on a centerline of the inlet aperture.

9. The inlet of claim 8, further comprising an aft compression truncated conical ellipsoid having a leading edge that is proximate to a trailing edge of the forward compression conical ellipsoid, the aft compression truncated conical ellipsoid linearly movable between a first position and a second position along an axis parallel to the axis of motion of the forward compression conical ellipsoid.

10. The inlet of claim 9, wherein the forward compression conical ellipsoid and the aft compression truncated conical ellipsoid are configured to move in unison to modify the compression of the incoming air at the inlet aperture and to move differentially to provide a selectable amount of boundary layer removal.

11. An air-breathing engine assembly, comprising:
    an engine configured to accept an incoming flow of air at a forward end and expel an exhaust at an aft end;
    an inlet assembly comprising:
        a housing coupled to the engine and defining an inlet aperture;
        a compression ramp surrounded by the inlet aperture, the compression ramp being movable with respect to the housing between a first position and a second position along an axis parallel to the direction of the incoming air flow;
        at least one compression element coupled to the housing and disposed between the compression ramp and the inlet aperture, the compression element having a first portion linearly movable with respect to the compression ramp between a first position and a second position along an axis parallel to a direction of the incoming air flow, the first portion having a forward edge configured to mate with an aft edge of the compression ramp, the compression element configured such that a boundary layer removal aperture is open when the first portion is in the first position and the boundary layer removal aperture is closed when the first portion is in the second position; and a first actuator coupled to the first portion of the compression element, the first actuator configured to selectable move the first portion between the first and second positions;

a second actuator coupled to the compression ramp, the second actuator configured to selectably move the compression ramp between the first and second positions;

wherein the first portion and the compression ramp are configured to move in unison to modify the compression of the incoming air and to move differentially to provide a selectable amount of boundary layer removal from the incoming air.

12. A method of removing a boundary layer from an incoming air flow at an inlet of an engine, the method comprising the steps of:

moving a forward portion of a compression element disposed in front of and surrounded by the inlet of the engine along an axis parallel to a direction of the incoming air flow so as to open a boundary layer removal aperture located between the inlet and the forward portion, the forward portion being moved to a selectable position to provide a selectable amount of boundary layer removal;

moving a second portion of the compression element in unison with the first portion of the compression element to modify the compression of the incoming air at the inlet aperture; and moving the second portion of the compression element move differentially from the first portion of the compression element to provide a selectable amount of boundary layer removal.

13. The inlet of claim 1, wherein when the boundary layer removal aperture is open, air flow is diverted through the boundary layer aperture along a path within, but separated from, the inlet aperture.

14. The inlet of claim 1, wherein the compression ramp is conical.

15. The inlet of claim 1, wherein the compression ramp is movable relative to the inlet aperture.

* * * * *